United States Patent [19]

Bell et al.

[11] 4,017,207
[45] Apr. 12, 1977

[54] GAS TURBINE ENGINE

[75] Inventors: John Kenneth Alexander Bell; John Rodney Dyson Fuller, both of Bristol, England

[73] Assignee: Rolls-Royce (1971) Limited, London, England

[22] Filed: Oct. 28, 1975

[21] Appl. No.: 626,238

[30] Foreign Application Priority Data

Nov. 11, 1974 United Kingdom ............ 48662/74

[52] U.S. Cl. .................. 415/115; 415/178; 415/117
[51] Int. Cl.² ........................................ F01D 5/00
[58] Field of Search ........... 415/115, 116, 117, 178

[56] References Cited

UNITED STATES PATENTS

| | | | |
|---|---|---|---|
| 2,700,530 | 1/1955 | Williams | 415/115 |
| 2,806,355 | 9/1957 | Schorner | 415/115 |
| 3,092,393 | 6/1963 | Morley et al. | 415/115 |
| 3,583,824 | 6/1971 | Smuland et al. | 415/116 |
| 3,628,880 | 12/1971 | Smuland et al. | 415/115 |
| 3,800,864 | 4/1974 | Hauser et al. | 415/115 |
| 3,825,365 | 7/1974 | Peng | 415/116 |

FOREIGN PATENTS OR APPLICATIONS 723,167 7/1942 Germany ........................ 415/116

Primary Examiner—Henry F. Raduazo
Attorney, Agent, or Firm—Stevens, Davis, Miller & Mosher

[57] ABSTRACT

A duct wall embracing the turbine of a gas turbine engine is cooled by impingement of air jets on to the outside of the wall. For control of the air flow the wall is surrounded by a chamber divided into inlet and outlet regions by a partition having spaced apart portions projecting towards the wall. The air jets emerge from nozzle openings in the free ends of the projections. Air rebounding from the wall enters the spaces between the projections and so does not interfere with the flow of fresh air thereby raising the efficiency of the heat exchange.

4 Claims, 5 Drawing Figures

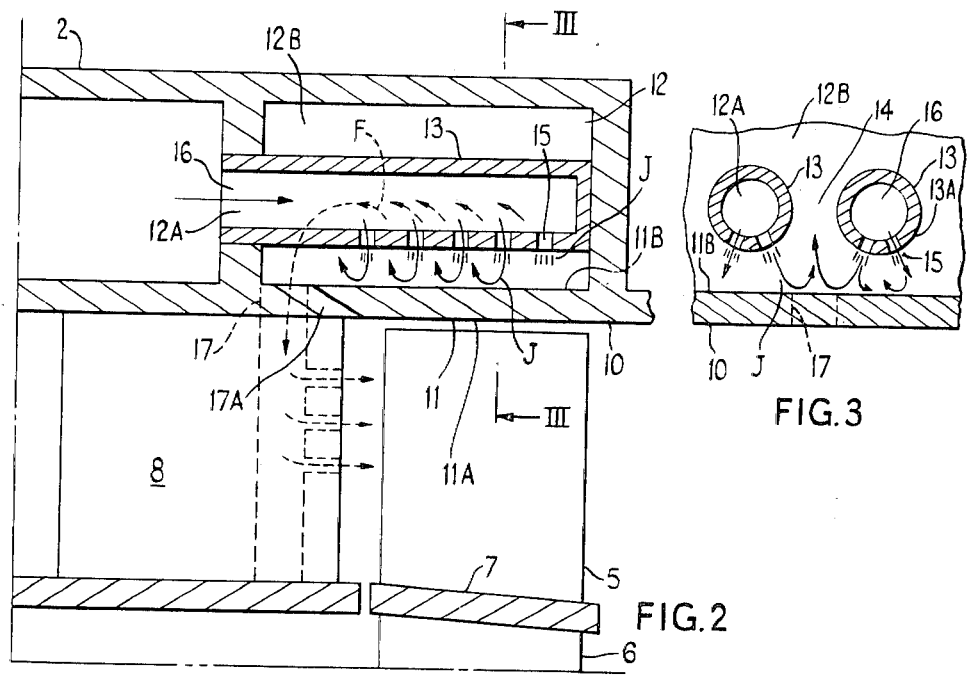
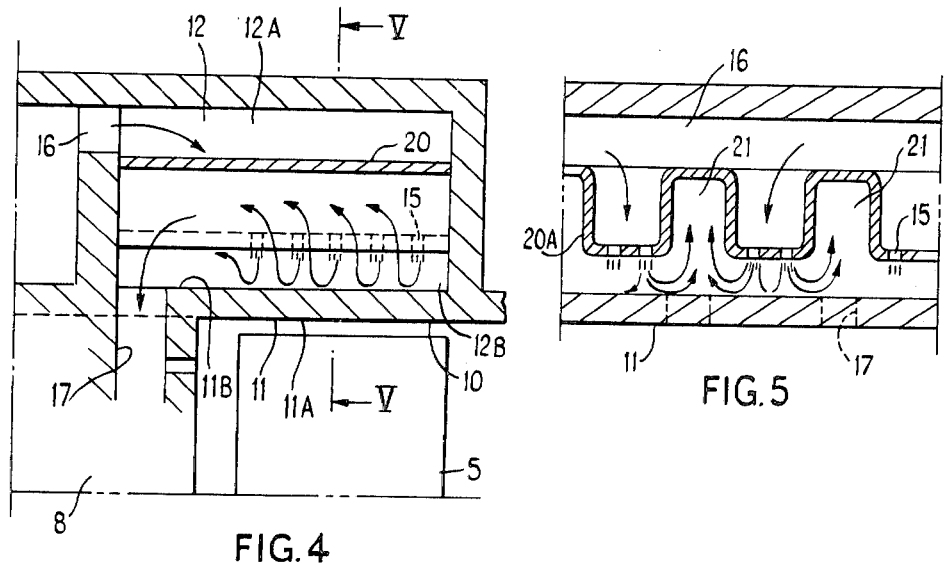
FIG. 2
FIG. 3
FIG. 4
FIG. 5

GAS TURBINE ENGINE

This invention relates to gas turbine engines of the kind having an annular duct for combustion products, the duct having a fixed wall whose interior surface is directly exposed to the combustion products. It is an object of this invention to provide an improved arrangement for cooling of the wall.

It is known to cool the wall by causing jets of cooling air to impinge on the outer surface of the wall but such arrangements have the disadvantage that air, having impinged on the outer surface and having become heated by contact therewith, has to travel along that surface before reaching an outlet. Insofar as the heated air remains at the outer surface, or insofar as the heated air mixes with fresh cooling air, the efficiency of the cooling process is reduced.

According to this invention there is provided a gas turbine engine comprising a duct for combustion products, a chamber for cooling fluid, a wall common to the chamber and the duct, a partition dividing the chamber into an inlet region spaced from the wall and an outlet region open to the wall, the partition having portions projecting towards the wall and being spaced apart to define therebetween spaces included in said outlet region, the projections having at their free ends nozzle openings directed towards the wall, a source of cooling air connected to the inlet region of the chamber, and an outlet from the outlet region of the chamber.

In operation, heated air rebounds from the wall and by passing into the spaces between the projections has an opportunity to come away from the wall without mixing with the fresh cooling air.

An example of an engine according to this invention will now be described with reference to the accompanying drawings wherein:

FIG. 2 is an enlarged detail of FIG. 1,

FIG. 3 is a section on the line III—III in FIG. 2,

FIG. 4 is a view similar to FIG. 2 but showing a modification, and

FIG. 5 is a section on the line V—V in FIG. 4.

Figure 1:
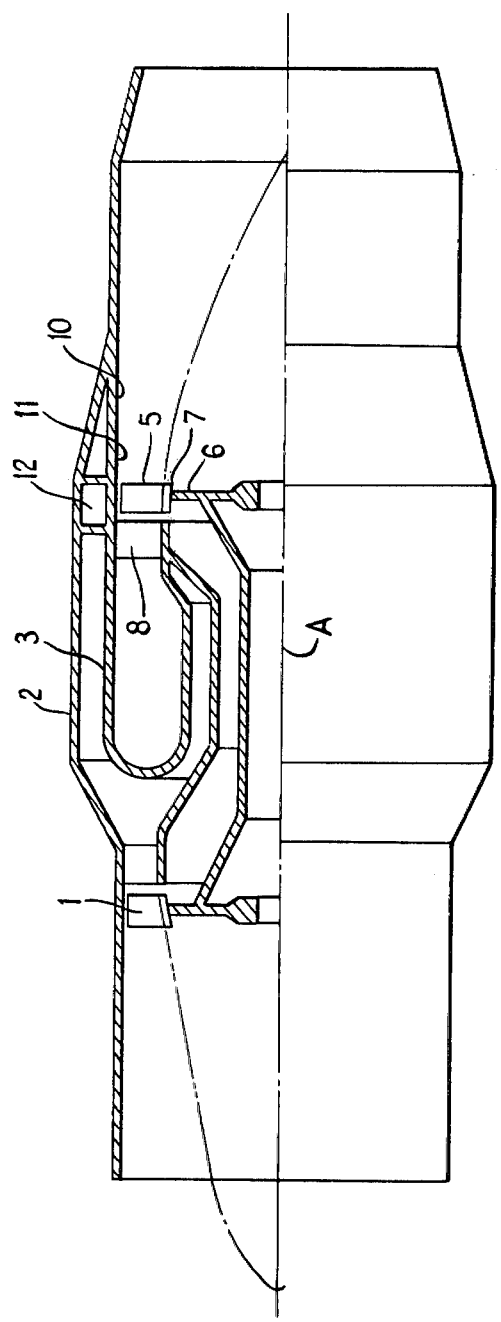
FIG. 1 is a part-sectional elevation of the engine.

The engine comprises (Fig. 1) a compressor 1 for delivering air to an air casing 2 from which the air enters a combustion chamber 3. Combustion products from the chamber pass through an annular duct 10 embracing an annular array of blades 5 of a turbine 6 which drives the compressor. The duct has an inner wall defined by root platforms 7 of the blades and an outer fixed wall 11. The flow axis of the duct is denoted A.

The wall 11 (FIGS. 2 and 3) has an inner surface 11A facing the hot flow of combustion products and an outer surface 11B facing the interior of a chamber 12 so that the wall is common to the chamber and the duct. The chamber contains tubes 13 which constitute a partition dividing the chamber into an inlet region 12A being the interior of the tubes and an outlet region 12B surrounding the tubes. The tubes extend in the direction of the axis A and lie parallel to the surface 11B and in spaced parallelism to each other. Portions 13A of the tubes near the surface 11B define projections having spaces 14 between them. At their extremities nearest the surface 11B the portions 13A have nozzle openings 15 positioned for directing jets J of cooling air on to the surface 11B. The air is derived from the compressor 1 through inlets 16 to the region 12A, and the region 12B has outlets 17 from the chamber 12. After impingement on the surface 11B the air passes into the spaces 14, as shown by flow lines F, and thence to the outlets 17. By virtue of this arrangement the return of heated air from the surface 11B does not interfere with fresh flow from the nozzles, i.e. with the jets J.

The outlet 17 is shown as entering a nozzle guide vane 8 upstream of the blades 5, the air finally discharging into the duct 10 through openings 9 in the trailing edge of the vane 8. However, the outlets 17 may be in the wall 11 anywhere upstream of the blades 5, e.g. as shown at 17A.

FIGS. 3 and 4 show the chamber 12 as being divided into inlet and outlet regions 12A, 12B by a partition having the form of a corrugated sheet 20 defining projections 20A separated by spaces 21 and containing the nozzle openings 15. Cooling air enters the region 12A through the inlet 16 and returns from the surface 11B via the spaces 21 to the outlets 17.

In the examples described the chamber 12 extends primarily in the region of the blades 5. In a modification (not shown) the chamber extends in the region of the vanes 8 for cooling the part of the wall 10 from which these vanes extend.

We claim:

1. A gas turbine engine comprising an annular duct for combustion products, means defining an annular cooling air chamber surrounding the duct, a wall common to the chamber and the duct, a source of pressurized cooling air, an annular array of nozzles arranged in the chamber and connected to be supplied by said cooling air source, the nozzles being directed for axial spaced jets of air emanating therefrom to impinge on to and return from said wall, the nozzles being arranged in rows parallel to the axis of said chamber, an outlet at one axial end of the means defining the chamber for the returned air, and said axial rows of nozzles being circumferentially spaced apart to define, between next adjacent ones of said rows, axially extending spaces accomodating the flow of returning air to said outlet.

2. A gas turbine engine according to claim 1 further comprising: a partition dividing said chamber into an inlet region spaced from the wall and an outlet region open to the wall, the partition having circumferentially spaced apart projection portions projecting toward the wall to define therebetween said axially extending spaces, the partition being defined by spaced apart tubes extending generally parallel to the wall, the interior of the tubes defining said inlet region, portions of the tubes facing the wall defining said projection portions and containing said nozzles.

3. A gas turbine engine according to claim 1 further comprising: a partition dividing said chamber into an inlet region spaced from the wall and an outlet region open toward the wall, the partition having spaced apart projection portions projecting toward the wall to define therebetween said axially extending spaces, the partition is defined by a corrugated sheet, the corrugations defining said projection portions and containing said nozzles.

4. A gas turbine engine according to claim 1 comprising a turbine rotor having an annular array of blades, said wall being situated annularly around said array, and said outlet being defined by an opening in the wall leading into the duct in a position upstream of the blades.

* * * * *